US009950657B2

(12) United States Patent
Dellock et al.

(10) Patent No.: US 9,950,657 B2
(45) Date of Patent: Apr. 24, 2018

(54) POLICE VEHICLE EXTERIOR LIGHT CONTROL

(71) Applicant: Ford Global Technologies, LLC, Dearborn, MI (US)

(72) Inventors: Paul Kenneth Dellock, Northville, MI (US); Pietro Buttolo, Dearborn Heights, MI (US); Stuart C. Salter, White Lake, MI (US); Doug H. Randlett, Metamora, MI (US); Christopher Charles Hunt, Livonia, MI (US); Matthew C. Mullen, New Hudson, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 70 days.

(21) Appl. No.: 15/192,525

(22) Filed: Jun. 24, 2016

(65) Prior Publication Data
US 2017/0368982 A1 Dec. 28, 2017

(51) Int. Cl.
| B60Q 1/24 | (2006.01) |
| B60Q 1/00 | (2006.01) |
| B60Q 1/26 | (2006.01) |
| F21S 8/00 | (2006.01) |
| H05B 37/02 | (2006.01) |
| H05B 33/08 | (2006.01) |
| F21S 8/10 | (2006.01) |

(52) U.S. Cl.
CPC ............ *B60Q 1/24* (2013.01); *B60Q 1/0035* (2013.01); *B60Q 1/2615* (2013.01); *F21S 8/003* (2013.01);
(Continued)

(58) Field of Classification Search
CPC ...... B60Q 1/24; B60Q 1/0035; B60Q 1/2611; B60Q 1/2615; B60Q 1/2696; B60Q 7/00;
(Continued)

(56) References Cited

U.S. PATENT DOCUMENTS 4,058,794 A * 11/1977 Menke ................. B60Q 1/2611
318/265
4,981,363 A * 1/1991 Lipman ................ B60Q 1/2611
362/135
(Continued)

FOREIGN PATENT DOCUMENTS

| CN | 101629702 B | 9/2011 |
| EP | 2719580 A1 | 4/2014 |

(Continued)

OTHER PUBLICATIONS

Search Report dated Dec. 19, 2017 for GB Patent Application No. GB1710028.0 (6 Pages).

*Primary Examiner* — Haissa Philogene
(74) *Attorney, Agent, or Firm* — James P. Muraff; Neal, Gerber & Eisenberg LLP

(57) ABSTRACT

Systems and methods are disclosed for a police vehicle exterior light control. An example disclosed police vehicle includes first beacons positioned on a chassis of the police vehicle, second beacons positioned on a lightbar of the police vehicle, and a plurality of spotlights on the lightbar. The example police vehicle also includes a light control unit that tracks a location of wearable nodes associated with a police officer. Additionally, the light control unit illuminates the area around the police officer using selected ones of the plurality of spotlights.

15 Claims, 6 Drawing Sheets

(52) U.S. Cl.
CPC ........... *F21S 48/236* (2013.01); *F21S 48/328* (2013.01); *H05B 33/0854* (2013.01); *H05B 37/0218* (2013.01); *H05B 37/0227* (2013.01); *H05B 37/0272* (2013.01)

(58) Field of Classification Search
CPC .......... A63H 5/00; A63H 17/25; A63H 17/32; A63H 17/28; H04W 4/046; H04W 4/023; F21W 2101/00; F21W 2101/02; H05B 37/0218; H05B 37/0227; H05B 37/0272; H05B 33/0854; F21S 10/06; F21S 8/003; F21S 48/328; F21S 48/236
See application file for complete search history.

(56) References Cited

U.S. PATENT DOCUMENTS

| | | | |
|---|---|---|---|
| 5,782,549 A | | 7/1998 | Glatzmeier et al. |
| 6,118,371 A | * | 9/2000 | Haddad .................. B60Q 1/14 307/10.8 |
| 6,367,949 B1 | | 4/2002 | Pederson |
| 6,879,263 B2 | * | 4/2005 | Pederson ............. B60Q 1/2611 340/815.45 |
| 7,106,185 B1 | * | 9/2006 | Neufeglise .......... B60Q 1/2611 340/468 |
| 7,551,102 B1 | | 6/2009 | Carson |
| 7,762,867 B2 | * | 7/2010 | Agostini .................. A63H 5/00 446/431 |
| 8,274,226 B1 | | 9/2012 | Sikora et al. |
| 8,711,197 B2 | * | 4/2014 | Dickerson ........ G08B 13/19645 348/14.01 |
| 2014/0354153 A1 | | 12/2014 | Pulido, Jr. |
| 2014/0354423 A1 | | 12/2014 | Luei |
| 2015/0035440 A1 | | 2/2015 | Spero |
| 2015/0149042 A1 | | 5/2015 | Cooper et al. |

FOREIGN PATENT DOCUMENTS

| | | |
|---|---|---|
| KR | 100848146 B1 | 7/2008 |
| WO | WO 2005/039394 A2 | 5/2005 |

\* cited by examiner

POLICE VEHICLE EXTERIOR LIGHT CONTROL

TECHNICAL FIELD

The present disclosure generally relates to police vehicles and, more specifically, a police vehicle exterior light control.

BACKGROUND

Police vehicle include spotlights to illuminate an area around the police vehicle. Often, a police officer manually pivots the spotlights to provide light to a desired location. If the wants to illuminate a different area, the police officer returns to the police vehicle and adjusts the spotlight.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for a police vehicle exterior light control. An example disclosed police vehicle includes first beacons positioned on a chassis of the police vehicle, second beacons positioned on a lightbar of the police vehicle, and a plurality of spotlights on the lightbar. The example police vehicle also includes a light control unit that tracks a location of wearable nodes associated with a police officer. Additionally, the light control unit illuminates the area around the police officer using selected ones of the plurality of spotlights.

An example method includes receiving signal strength values from wearable nodes associated with a police officer from at least one of first beacons positioned on a chassis of the police vehicle or second beacons positioned on a lightbar of the police vehicle. The example method also includes tracking a location of the wearable nodes. Additionally, the example method includes illuminating the area around the police officer using ones of a plurality of spotlights located on the lightbar.

An tangible computer readable medium comprises instructions that, when executed, cause a police vehicle to receive signal strength values from wearable nodes associated with a police officer from at least one of first beacons positioned on a chassis of the police vehicle or second beacons positioned on a lightbar of the police vehicle. Additionally, the instructions, when executed, cause the police vehicle to track a distance of the wearable nodes. The instructions, when executed, also cause the police vehicle to illuminate the area around the police officer using ones of a plurality of spotlights located on the lightbar based on the track location of the wearable nodes.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1A:
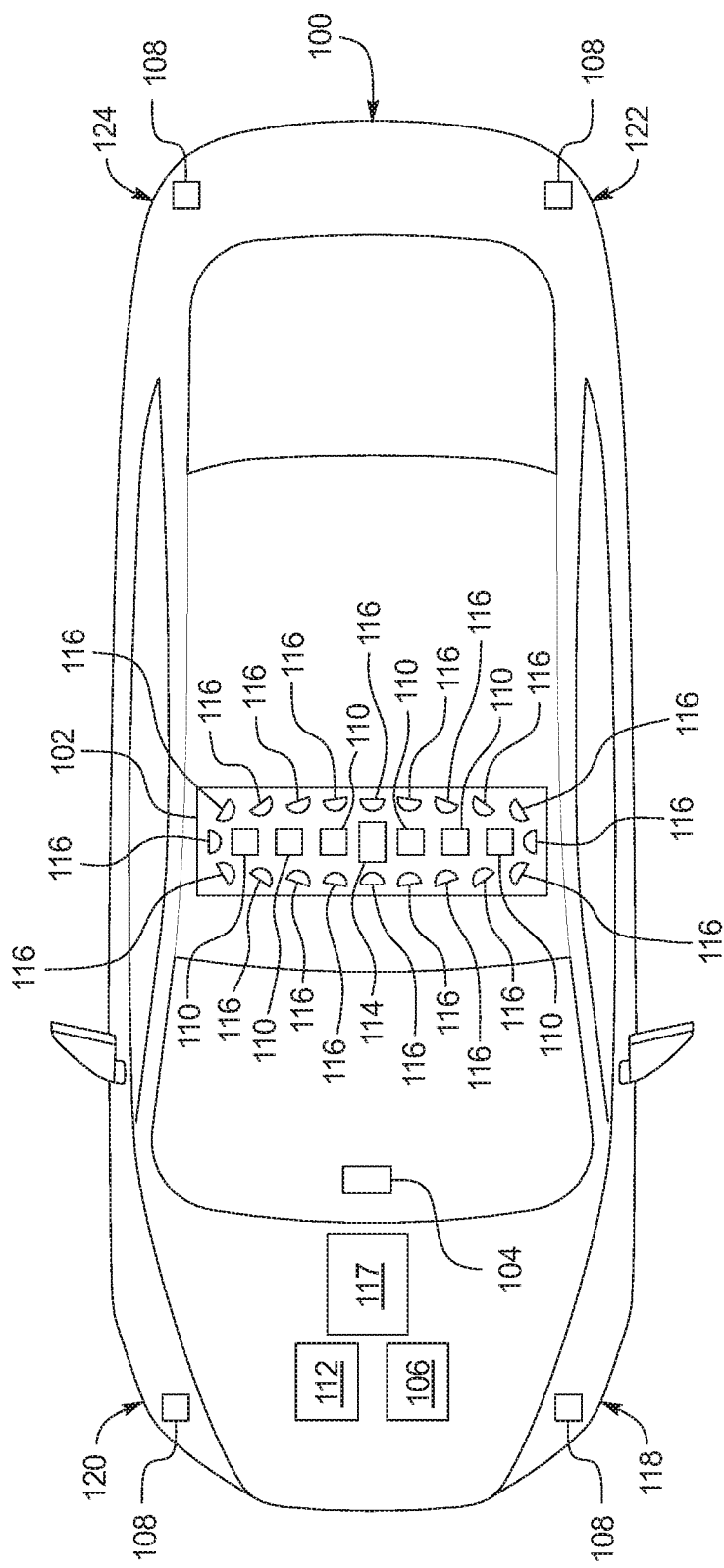
FIGS. 1A, 1B, and 1C illustrate a police vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

A light control unit monitors the location of one or more police officers. The police vehicle includes wireless nodes installed on the chassis and the light bar. The wireless nodes include direction antenna to create overlapping detection zones around the police vehicle. The police officer(s) wear wireless nodes (e.g., on a belt, on a vest, etc.). The light control unit determines the location of the police officers based on received signal strength indications (RSSI) and/or received transmission strengths (RX) between the wireless nodes of the police vehicle and the wireless nodes worn by the officers. The location of the officer(s) is/are estimated via trilateration. As used herein, the terms "trilaterate" and "trilateration" are defined as the process of determining locations of points (e.g., the wireless nodes, etc.) by measurement of distances, using the geometry of circles, spheres or triangles. The police assistance unit determines (a) a distance between the police vehicle and the police officer, and (b) a location of the police officer relative to the police vehicle.

Based on the position of the police officer, the light control unit controls spotlights on the light bar. By selecting different spotlights, the light control unit can illuminate different areas around the police vehicle. As the police officer moves, the light control unit operates different spotlights to maintain the illumination on the police officer. The spotlights may include an array of high-intensity light emitting diodes (LEDs) that may be energized to control the intensity of the illumination and/or the vertical angle of illumination. For example, a first set of LEDs in the spotlight may be angled to illuminate an area above a horizontal plane, a second set of LEDs in the spotlight may be angled to illuminate are area at the horizontal plane, and a third set of LEDs in the spotlight may be angled to illuminate an area below a horizontal plane. The wireless nodes are communicatively coupled to a light controller. The police officer may user the light controller to (a) broaden and narrow the illuminated area, (b) increase and decrease the intensity of the illumination, and/or (c) change the vertical angle of the illumination.

Figure 1B:
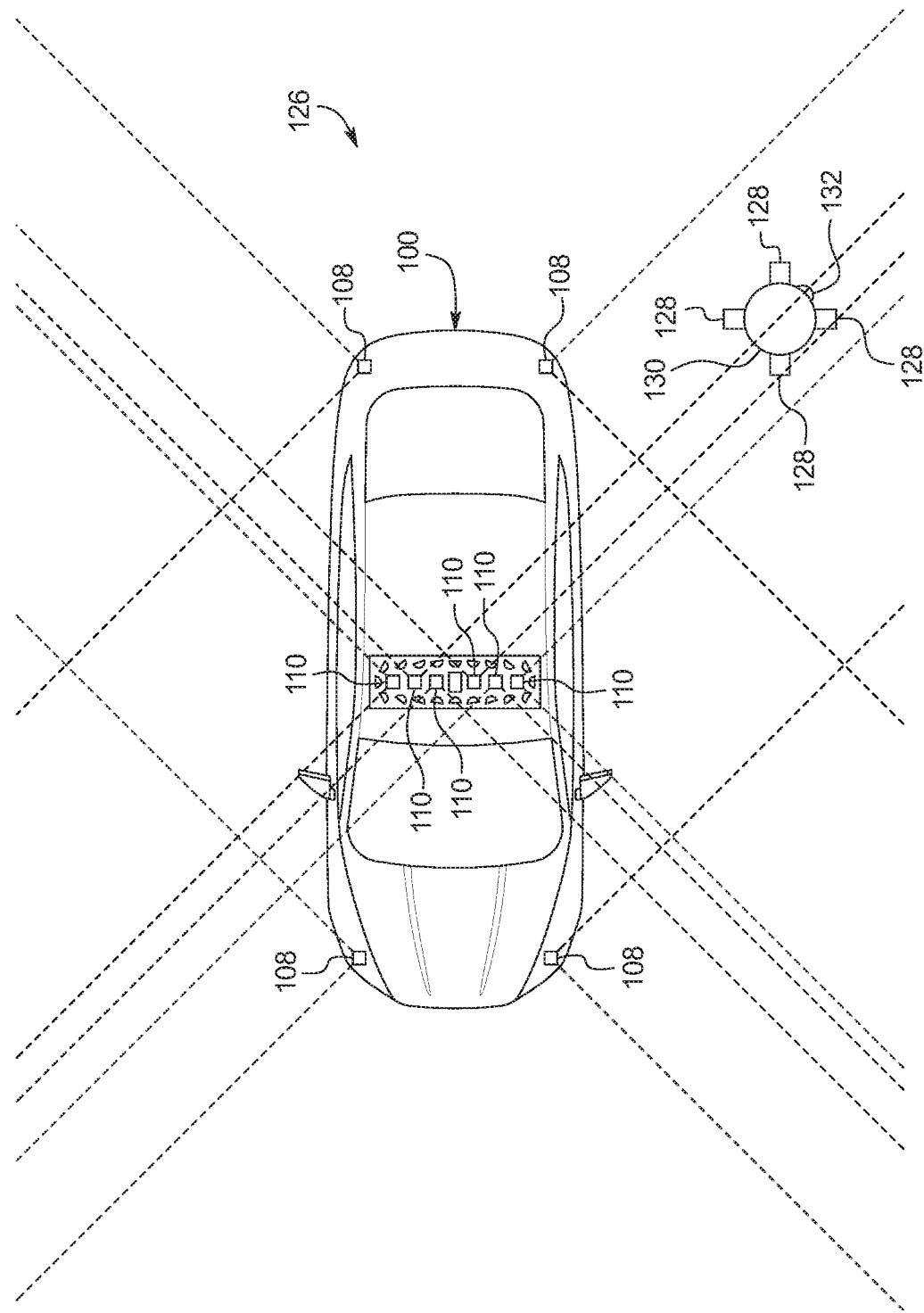
Figure 1C:
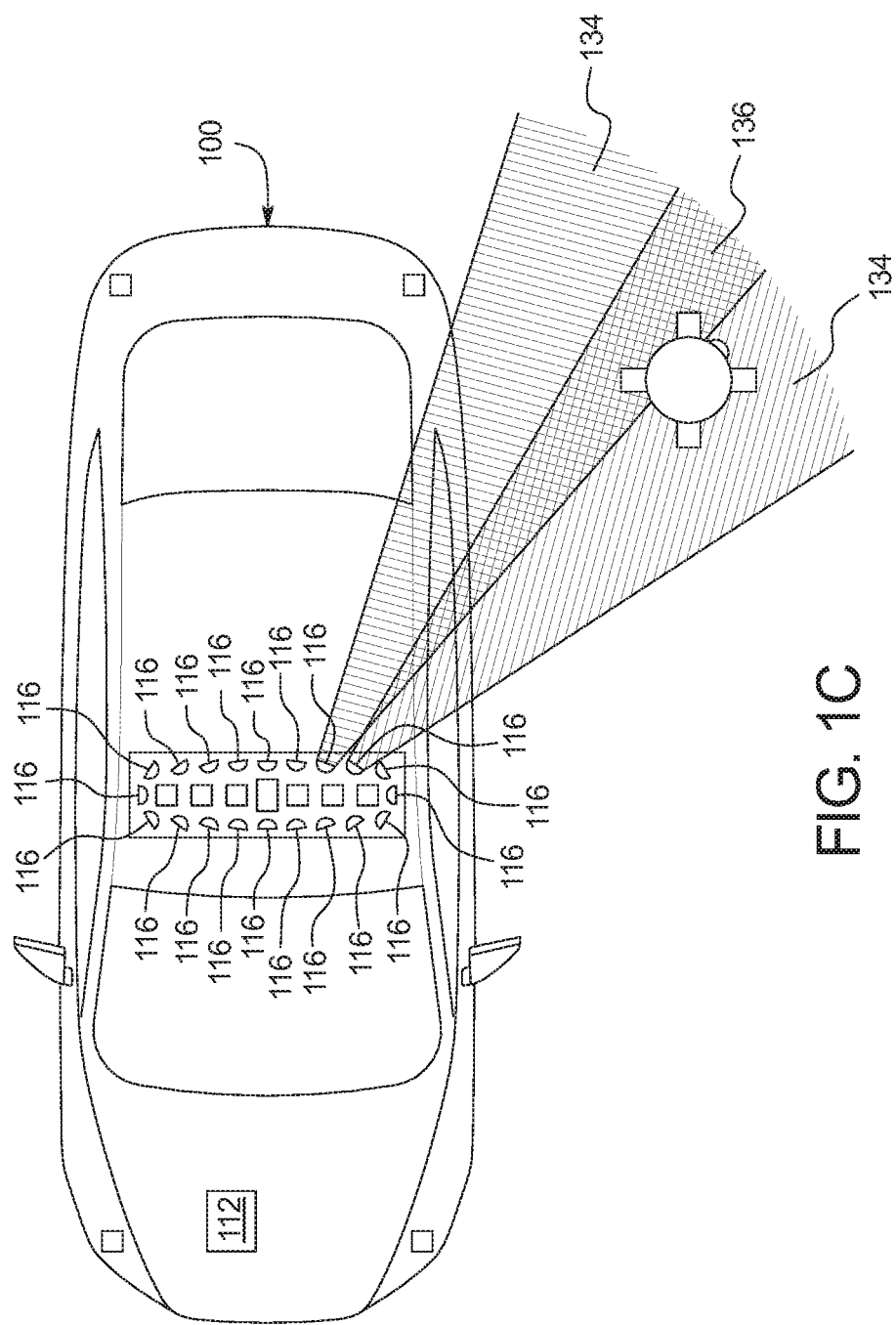

FIGS. 1A, 1B, and 1C illustrate a police vehicle 100 operating in accordance with the teachings of this disclosure. The police vehicle 100 may be any suitable type of vehicle (e.g., a car, a truck, a van, a tactical vehicle, etc.). The police vehicle 100 may be a standard gasoline powered vehicle, a hybrid vehicle, an electric vehicle, a fuel cell vehicle, and/or any other mobility implement type of vehicle. The police vehicle 100 includes parts related to mobility, such as a powertrain with an engine, a transmission, a suspension, a driveshaft, and/or wheels, etc. The police vehicle 100 may be non-autonomous or semi-autonomous. In the illustrated example, the police vehicle 100 includes a light bar 102, a light sensor 104, a battery control unit 106, chassis wireless nodes 108, light bar wireless nodes 110, and a light control unit 112.

In the illustrated example, the light bar 102 includes rotational lights in different colors, such as red and blue, fixed-beam lights, LED-based lights, and/or a siren, etc. The light bar 102 includes the light bar wireless nodes 110 (sometimes referred to as "light bar beacons"). In the illustrated example, the light bar 102 includes a power module 114 and spotlights 116. The power module 114 is electrically coupled to a battery 117 of the police vehicle 100 via a vehicle power bus. In some examples, the power module 114 includes an additional battery that is charged when the engine of the police vehicle 100 is running. The power module 114 regulates and provides power to LEDs of the spotlights 116. The power module 114 is communicatively coupled to the light control unit 112. The power control module 114 received instructions for which spotlights 116 and/or to which LEDs in the spotlights 116 to which to provide power. As discuss in connection with FIG. 2 below, the spotlights 116 include an array of LEDs that may be used to control the intensity of the light produced by the corresponding spotlight 116, and the horizontal angle of the light. The spotlights 116 are positioned in a ring around the light bar 102 to illuminate around the police vehicle 100. The spotlights 116 are angled to face different directions around the police vehicle 100.

The light sensor 104 measures ambient light in the vicinity of the police vehicle 100. The light sensor 104 may be, for example, embedded in the dashboard or incorporated into the rear-view mirror. In some examples, the light control unit 112 controls the intensity of the spotlights 116 based on the ambient light measured by the light sensor 104. For example, the light control unit 112 may increase the intensity of the spotlight(s) 116 as the brightness of the ambient light decreases.

The battery control unit 106 monitors and controls the charge and discharge of the 117 of the police vehicle 100. The battery control unit 106 provides information regarding the state of the battery 117, such as voltages of the battery cells, current delivered by the battery, and/or the temperature of the battery, etc. Additionally, the battery control unit 106 determines when (a) the current output of, for example, the alternator is not sufficient to drive the auxiliary systems (e.g., the HVAC system, the communication systems, power steering and braking systems, the internal and external lighting systems, the spotlights 116, etc.) and recharge the battery 117, and (b) the charge of the battery 117 does not satisfy (e.g., is less than) a threshold charge. The threshold charge is a charge above which the battery 117 is able to supply the current to cold start the police vehicle 100.

The chassis wireless nodes 108 (sometimes referred to as "chassis beacons") are positioned on the chassis of the police vehicle 100. In the illustrated example, the chassis beacons 108 are positioned on a front driver-side corner 118, a front passenger-side corner 120, a rear driver-side corner 122, and a rear passenger-side corner 124. The chassis beacons 108 and the light bar beacons 110 include hardware and firmware to implement a short-range wireless network, such as Bluetooth Low Energy (BLE). The BLE protocol is set forth in Volume 6 of the Bluetooth Specification 4.0 (and subsequent revisions) maintained by the Bluetooth Special Interest Group. In some examples, the beacons 108 and 110 include multidirectional antenna. Alternatively or additionally, in some examples, the beacons 108 and 110 include directional antennas.

As illustrated in FIG. 1B, the beacons 108 and 110 create a detection zone 126 around police vehicle 100. The size of the detection zone 126 is determined by the ranges of the beacons 108 and 110. For example, the range for BLE-based beacons 108 and 110 with multi-directional antenna may be 10 meters (33 feet) and the range for BLE-based beacons 108 and 110 with directional antenna may be 50 meters (164 feet). Police officers wear one or more wearable wireless nodes 128 on an item of clothing 130 (e.g., a belt, a vest, etc.). In some examples, the wearable wireless nodes 128 include an identifier (e.g., an alphanumeric value) that identifies a particular police officer associated with the item of clothing 130. The item of clothing 130 also includes a spotlight controller 132 that (i) facilitates the police officer controlling the spotlights 116, and (ii) provides notifications (e.g., an alarm, a buzzer, a speaker, etc.) to provide audible and/or haptic feedback to the police officer.

Messages exchanged between the wearable wireless nodes 128 and the beacons 108 and 110 include the RSSI and/or the RX between wearable wireless nodes 128 and the beacons 108 and 110. The RSSI and RX values measure the open-path signal strength that the one of the wearable wireless nodes 128 detects from the corresponding beacon 108 and 110. The RSSI is measured in signal strength percentage, the values (e.g., 0-100, 0-137, etc.) of which are defined by a manufacturer of hardware used to implement the beacons 108 and 110. Generally, a higher RSSI means that the wearable wireless node 128 is closer to the corresponding beacon 108 and 110. The RX values are measured in Decibel-milliWatts (dBm). For example, when the wearable wireless nodes 128 are one meter (3.28 feet) away, the RX value may be −60 dBm, and when the wearable wireless nodes 128 are two meters (6.56 feet) away, the RX value may be −66 dBm. The RSSI/RX values are used to determine the distance from the wearable wireless nodes 128 to the particular beacon 108 and 110. In the illustrated example, the beacons 108 and 110 determines up to four distance measurements corresponding to the four wearable wireless nodes 128. In some examples, when the two or more beacons 108 and 110 detect the wearable wireless nodes 128, the location of the corresponding police officer relative the police vehicle 100 may be determined.

As illustrated in FIG. 1C, the light control unit 112 tracks the location of the police officer(s) and illuminate relatively constant area around the police office(s). The light control unit 112 is communicatively coupled to the light sensor 104, the battery control unit 106, the beacons 108 and 110, and the power module 114. The light control unit 112 receives the RSSI/RX measurements from the beacons 108 and 110. Based on (a) the beacon(s) 108 and 110 that detected the wearable wireless nodes 128 and (b) the RSSI/RX measurements associated with the wearable wireless nodes 128, the light control unit 112 determines (i) the distances of the corresponding police officer(s) from the police vehicle 100 and/or (ii) the location of the police officer(s) relative to the police vehicle 100. The spotlights 116 are configured to illuminate an area 134. In the illustrated example, neighboring spotlights 116 are configured to have a portion 136 of the respective areas 134 overlap. The light control unit 112 activates (via the power control module 114) one or more of the spotlights to illuminate the area around the police officer. In some examples, the number of spotlights 116 illuminated is controllable with the spotlight controller 132 of the item of clothing 130. When the police officer associated with the item of clothing 130 moves, the light control unit 112 activates and deactivates spotlights 116 so that the illuminated area follows the police officer. In some examples, the light control unit 112 illuminates relatively constant area around the police office by decreasing the intensity of the corresponding spotlight(s) when the police officer is close to the police vehicle 100 and increasing the intensity of the corresponding spotlight(s) when the police officer is relatively farther away from the police vehicle 100.

In some examples, the light control unit 112 activates a plurality of the spotlights 116 at a lower intensity to create a wide light field when the police officer (e.g., the associated item of clothing 130) is relatively close to the police vehicle 100. In such examples, as the police officer (e.g., the associated item of clothing 130) moves farther from the police vehicle 100, the light control unit 112 (a) deactivates some of the plurality of the spotlights 116, and (b) increases the intensity of the activated spotlights 116 to create a narrower light field at a higher intensity. For example, when the police officer (e.g., the associated item of clothing 130) is a meter away from the police vehicle 100, the light control unit 112 may activate four spotlights 116 at a low intensity centered on the police officer. As another example, when the police officer (e.g., the associated item of clothing 130) is five meters away from the police vehicle 100, the light control unit 112 deactivates two of the spotlights 116 and increases the intensity of the remaining two spotlights 116 to a medium intensity.

The spotlight controller 132 is communicatively coupled to one or more of the beacons 108 and 110. The spotlight controller 132 receives notifications from the light control unit 112 and the light control unit 112 receives commands from the spotlight controller 132. In some examples, the spotlight controller 132 includes an ambient light sensor. In such examples, the spotlight controller 132 sends messages to the light control unit 112 that include the ambient light values at the location of the police officer measured by the ambient light sensor. The spotlight controller 132 facilitates the police officer increasing the width of light field around the police officer (e.g., by activating additional spotlights 116). The spotlight controller 132 facilitates the police officer decreasing the width of light field around the police officer (e.g., by deactivating spotlights 116). The spotlight controller 132 facilitates the police officer increasing and decreasing the intensity of light field around the police officer (e.g., by changing the number of activated LEDs within the activated spotlights 116). In some examples, the spotlight controller 132 facilitates the police officer, via an analog controller, to offsetting the light beam along a desired direction. The spotlight controller 132 facilitates the police officer changing the angle of the spotlights 116 to manage the horizontal location and/or height of the light field. For example, if the police vehicle 100 is parked on top of an embankment, the police officer may, via the spotlight controller 132, direct the light field generated by the spotlights 116 to be lower than the horizontal plane.

Additionally, in some examples, the light control unit 112 alerts the police officer, via the spotlight controller 132, when (a) the battery 117 of the police vehicle 100 has a low charge, and/or (b) the temperature of the LEDs of the spotlight(s) is/are exceed an operating threshold. In some examples, the spotlight controller 132 includes a photo flash function. In such examples, the photo flash function flashes a bright light from the spotlights 116 for a period of time (e.g., 100 milliseconds, etc.) to distract, divert, and/or temporarily blind. In such examples, the photo flash function is enabled by button push on spotlight controller 132 that has a 2 second delay. Additionally, in some such examples, the light control unit 112 with warning to other police officer (e.g., via corresponding items of clothing 130) in the vicinity of the police vehicle 100 before flash occurs.

Figure 2:
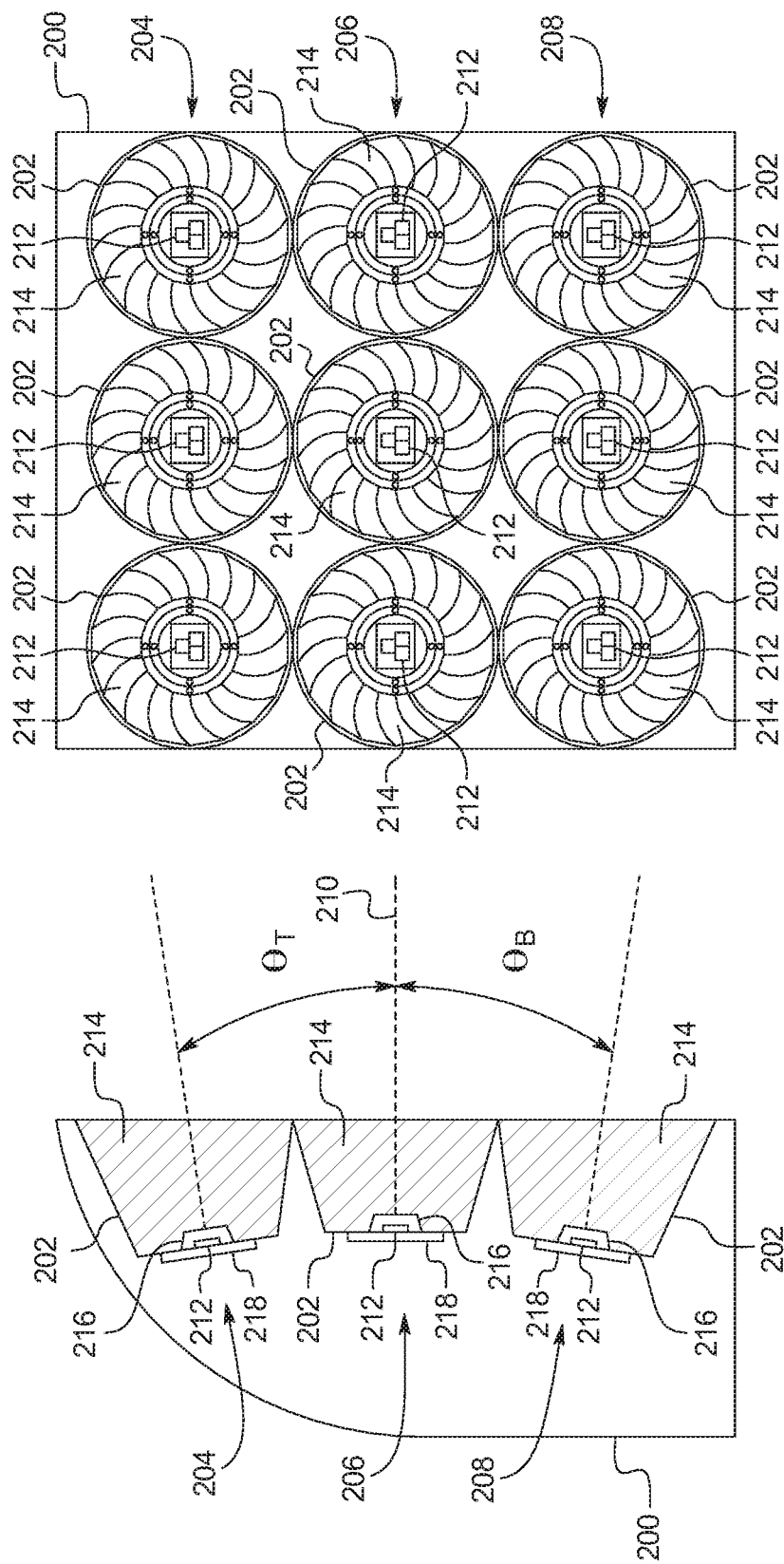
FIG. 2 is an example LED-based spotlight of the police vehicle of FIGS. 1A, 1B, and 1C.

FIG. 2 is an example LED-based spotlight 116 of the police vehicle 100 of FIGS. 1A, 1B, and 1C. In the illustrated example, the spotlight 116 includes a housing 200 and LED assemblies 202. The housing 200 is attached to the light bar 102. The LED assemblies 202 are electrically coupled to the power module 114. In the illustrated example, the LED assemblies 202 are organized into a top row 204, a middle row 206, and a bottom row 208. The rows 204-208 include multiple LED assemblies 202 to facilitate the light control unit 112 activating or deactivating the LED assemblies 202 in one of the rows 204-208 to control the intensity of the light field at the corresponding angle from the horizontal plane 210. The LED assemblies 202 of the rows 204-208 are directed to different angles (e.g., $\theta_T$, $\theta_B$) relative to the horizontal plane 210 to facility the spotlight 116 to varying the height of the generated light field. In some examples, the LED assemblies 202 of the top row 204 are angled (e.g., at $\theta_T$) to illuminate areas at a height greater than the height of the police vehicle 100. In some examples, the middle row 206 of the LED assemblies 202 is directed to the horizontal plane 210. In some examples, the bottom row 208 of the LED assemblies 202 are angled (e.g., at $\theta_B$) to illuminate areas that are below the police vehicle 100. For example the bottom row 208 of the LED assemblies 202 may be angled to illuminate an area lower than the police vehicle 100 when the police vehicle 100 is on top of an embankment. The LED assemblies 202 are structured so that the light from the LED assemblies 202 in the corresponding row 204-208 are aimed at the same spot. In some examples, (i) a low intensity setting of the spotlight 116 includes one LED assembly 202 being activated, (ii) a medium intensity setting of the spotlight 116 includes two LED assemblies 202 being activated, and (iii) a high intensity setting of the spotlight 116 includes three LED assemblies 202 being activated The LED assemblies 202 include one or more LEDs 212, a reflective housing 214, optics 216, and a heat sink 218. The LED(s) 212 is/are high-intensity LEDs (e.g., LEDs that generate 1000 lumens, 2000 lumens, or 3000 lumens, etc.). The reflective housing 214 and the optics 216 focus (e.g., via total internal reflection) the light generated by the LED(s) 212 to narrow the light field generated by the LED(s) 212. For example, the reflective housing 214 and the optics 216 may focus the light generated by the LED(s) 212 to be 60 degrees. The heat sink 218 is coupled to the LED(s) 212 to dissipate heat generated by the LED(s) 212.

Figure 3:
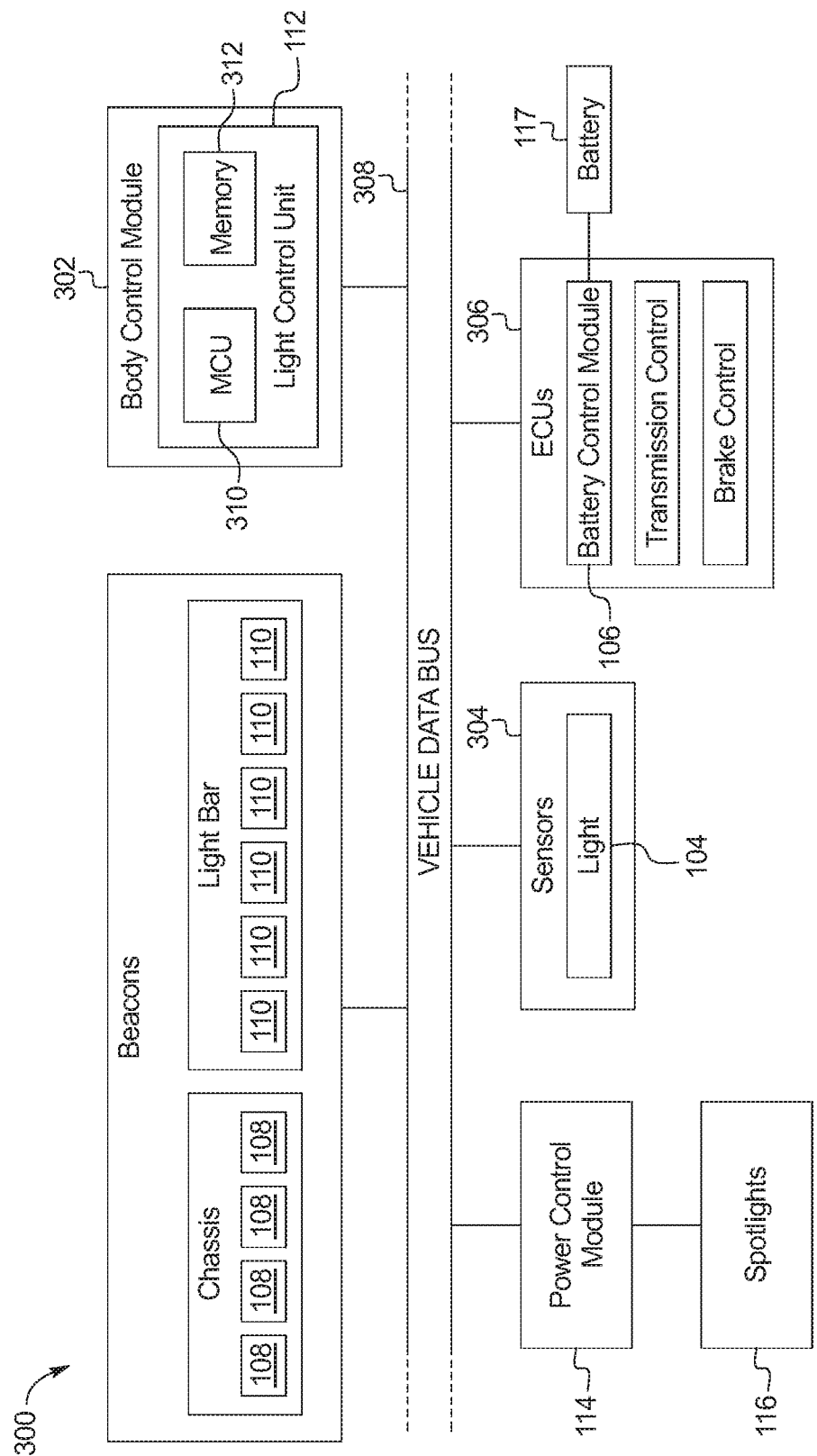
FIG. 3 is a block diagram of the electrical components of the police vehicle of FIGS. 1A, 1B, and 1C.

FIG. 3 is a block diagram of the electrical components 300 of the police vehicle 100 of FIGS. 1A, 1B, and 1C. In the illustrated example, the electrical components 300 include the beacons 108 and 110, the power control module 114, a body control module 302, sensors 304, electronic control units (ECUs) 306, and the vehicle data bus 308.

The body control module 302 controls various subsystems of the police vehicle 100. For example, the body control module 302 may control power windows, power locks, an immobilizer system, and/or power mirrors, etc. The body control module 302 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. In the illustrated example, the body control module 302 includes the light control unit 112. Alternatively, in some examples, the light control unit 112 is an ECU 306 separate from the body control module 302.

In the illustrated example, the light control unit 112 includes a processor or controller 310 and memory 312. The processor or controller 310 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 312 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and or high-capacity storage devices (e.g., a hard drive, a solid state drive, etc.). In some examples, the memory 312 includes multiple kinds of memory, particularly volatile memory and non-volatile memory.

The memory 312 is/are computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 312, the computer readable medium, and/or within the processor 310 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 304 may be arranged in and around the police vehicle 100 in any suitable fashion. The sensors 304 may include camera(s), sonar, RADAR, LiDAR, ultrasonic sensors, optical sensors, or infrared devices configured to measure properties around the exterior of the police vehicle 100. Additionally, some sensors 304 may be mounted inside the cabin of the police vehicle 100 or in the body of the police vehicle 100 (such as, the engine compartment, the wheel wells, etc.) to measure properties in the interior of the police vehicle 100. For example, such sensors 304 may include accelerometers, odometers, tachometers, pitch and yaw sensors, wheel speed sensors, microphones, tire pressure sensors, and biometric sensors, etc. In the illustrated example, the sensors 304 include the light sensor 104.

The ECUs 306 monitor and control the subsystems of the police vehicle 100. The ECUs 306 communicate and exchange information via a vehicle data bus (e.g., the vehicle data bus 308). Additionally, the ECUs 306 may communicate properties (such as, status of the ECU 306, sensor readings, control state, error and diagnostic codes, etc.) to and/or receive requests from other ECUs 306. Some police vehicles 100 may have seventy or more ECUs 306 located in various locations around the police vehicle 100 communicatively coupled by the vehicle data bus 308. The ECUs 306 are discrete sets of electronics that include their own circuit(s) (such as integrated circuits, microprocessors, memory, storage, etc.) and firmware, sensors, actuators, and/or mounting hardware. In the illustrated example, the ECUs 306 include the battery control unit 106.

In the illustrated example, the vehicle data bus 308 includes one or more data buses wired throughout the police vehicle 100. The vehicle data bus 308 communicatively couples the ECUs 306, the sensors 304, the power module 114, the beacons 108 and 110, and the light control unit 112. In some examples, the vehicle data bus 308 is implemented in accordance with the controller area network (CAN) bus protocol as defined by International Standards Organization (ISO) 11898-1. Alternatively or additionally, in some examples, the vehicle data bus 308 may include a Media Oriented Systems Transport (MOST) bus, or a CAN flexible data (CAN-FD) bus (ISO 11898-7).

Figure 4:
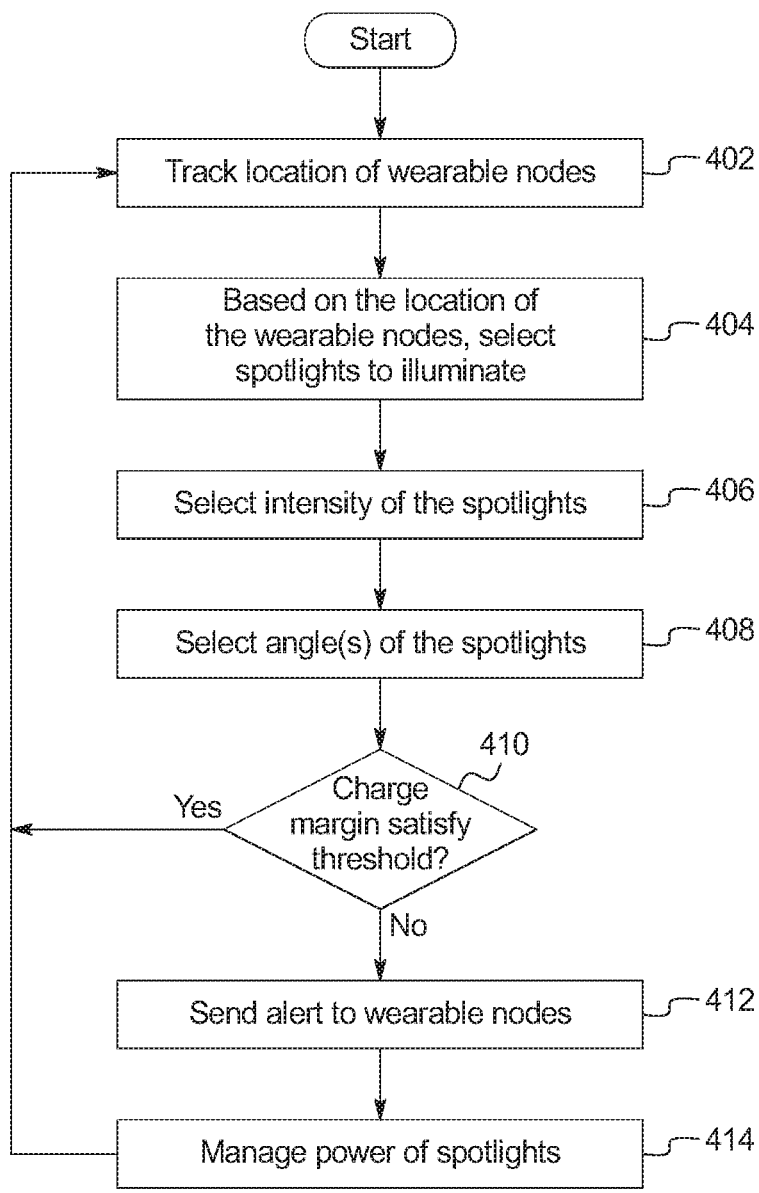
FIG. 4 is a flow diagram of a method to control the spotlights of the vehicle of FIGS. 1A, 1B, and 1C.

FIG. 4 is a flow diagram of a method to control the spotlights 116 based on the location relative to the police vehicle 100 of the wearable wireless nodes 128. Initially, at block 402, the light control unit 112 tracks, via the beacons 108 and 110, the location of the police officer associated with the wearable wireless nodes 128. At block 404, based on the location of the police officer associated with the wearable wireless nodes 128, the light control unit 112 selects one or more of the spotlights 116 to activate.

At block 406, the light control unit 112 selects an intensity for the spotlight(s) 116 selected at block 404. The intensity of the spotlight(s) 116 is based on (a) the relative distance of the police officer associated with the wearable wireless nodes 128 from the police vehicle 100, (b) the measurements from the light sensor 104, and/or the input from the spotlight controller 132 associated with the police officer. For example, if the police officer associated with the wearable wireless nodes 128 is relatively close to the police vehicle 100, the light control unit 112 may select a lower intensity. The light control unit 112 controls the intensity of the light by activating, via the power control module 114, different numbers of LED assemblies 202 in one of the rows 204-208. For example, for a low intensity, the light control unit 112 may activate the LEDs 212 in one of the LED assemblies 202 in the middle row 206. At block 408, the light control unit 112 selects the angle(s) at which to create the light field. The light control unit 112 selects the angle(s) by activating the LED assemblies 202 in one or more rows 204-208 of the spotlight 116, At block 410, the light control unit 112 determines whether the charge margin of the battery 117 satisfies a threshold. The light control unit 112 receives the status of the battery from the battery control unit 106. The charge margin of the battery 117 satisfies the threshold when (a) the current output of the alternator is sufficient to supply the load of the police vehicle 100 to drive the auxiliary systems and recharge the battery, and (b) the charge of the battery 117 satisfies (e.g., is greater than or equal to) the threshold charge set to prevent the battery 117 from losing charge so to not be able to cold start the police vehicle 100. If the charge margin of the battery 117 satisfies the threshold, the method returns to block 402. Otherwise, if the charge margin of the battery 117 does not satisfy the threshold, the method continues at block 412.

At block 412, the light control unit 112 sends, via the beacons 108 and 112, an alert to the wearable wireless node(s) 128 to inform the police officer that the charge margin of the battery 117 of the police vehicle 100 is low. At block 414, the light control unit 112 manages the power consumed by the spotlight(s) 116 selected at block 404. In some examples, the light control unit 112 decreases the intensity of the spotlight(s) 116 and/or decreases the number of spotlights 116 activated. The method then returns to block 402.

The flowchart of FIG. 4 is a method that may be implemented by machine readable instructions that comprise one or more programs that, when executed by a processor (such as the processor 310 of FIG. 3), cause the police vehicle 100 to implement the light control unit 112 of FIGS. 1A, 1B, 1C, and 3. Further, although the example program(s) is/are described with reference to the flowcharts illustrated in FIG. 4, many other methods of implementing the example light control unit 112 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A police vehicle comprising:
   first beacons positioned on a chassis of the police vehicle;
   second beacons positioned on a lightbar of the police vehicle;
   a plurality of spotlights on the lightbar; and
   a light control unit, including a processor, to:
      track a location of wearable nodes associated with a police officer; and
      illuminate an area around the police officer using selected ones of the plurality of spotlights.

2. The police vehicle of claim 1, wherein to track the location of the wearable nodes associated with the police officer, the light control unit is to obtain signal strength values between the wearable nodes and at least one of the first beacons or the second beacons.

3. The police vehicle of claim 1, wherein the light control unit is to:
   select ones of the plurality of spotlights based on the location of the police officer relative the police vehicle; and
   select an intensity of the spotlights.

4. The police vehicle of claim 3, wherein the selected intensity of the spotlights is based on a distance between the police officer and the police vehicle.

5. The police vehicle of claim 3, wherein the light control unit is to select a number of the plurality of spotlights based on a distance between the police officer and the police vehicle.

6. The police vehicle of claim 3, wherein the light control unit is to, in response to a command from a spotlight controller associated with the wearable nodes, change LEDs within the selected ones of the plurality of spotlights to change a horizontal angle at which the selected ones of the plurality of spotlights project light.

7. The police vehicle of claim 1, including:
   monitor a charge margin of a battery of the police vehicle; and
   in response to the charge margin not satisfying a charge threshold, send an alert to the police officer via the wearable nodes.

8. A police vehicle method comprising:
   receiving signal strength values from wearable nodes associated with a police officer from at least one of first beacons positioned on a chassis of a police vehicle or second beacons positioned on a lightbar of the police vehicle;
   tracking, with a processor, a location of the wearable nodes, and
   illuminating the area around the police officer using ones of a plurality of spotlights located on the lightbar.

9. The method of claim 8, wherein a light control unit is to:
   select ones of the plurality of spotlights based on the location of the police officer relative the police vehicle; and
   select an intensity of the spotlights.

10. The method of claim 9, wherein the selected intensity of the spotlights is based on a distance between the police officer and the police vehicle.

11. The method of claim 9, wherein the light control unit is to select a number of the plurality of spotlights based on a distance between the police officer and the police vehicle.

12. The method of claim 9, wherein the light control unit is to, in response to a command from a spotlight controller associated with the wearable nodes, change LEDs within the selected ones of the plurality of spotlights to change a horizontal angle at which the selected ones of the plurality of spotlights project light.

13. The method of claim 8, including:
   monitoring a charge margin of a battery of the police vehicle; and
   in response to the charge margin not satisfying a charge threshold, sending an alert to the police officer via the wearable nodes.

14. The method of claim 8, including:
   monitoring a charge margin of a battery of the police vehicle; and
   in response to the charge margin not satisfying a charge threshold, managing power consumption of the ones of a plurality of spotlights.

15. A tangible computer readable medium comprising instructions that, when executed, cause a police vehicle to:
   receive signal strength values from wearable nodes associated with a police officer from at least one of first beacons positioned on a chassis of the police vehicle or second beacons positioned on a lightbar of the police vehicle;
   track a distance of the wearable nodes, and
   illuminate an area around the police officer using ones of a plurality of spotlights located on the lightbar based on the tracked distance of the wearable nodes.

* * * * *